(12) United States Patent
Longacre, Jr.

(10) Patent No.: US 8,011,596 B2
(45) Date of Patent: Sep. 6, 2011

(54) MACHINE READABLE 2D SYMBOLOGY PRINTABLE ON DEMAND

(75) Inventor: Andrew Longacre, Jr., Skaneateles, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 466 days.

(21) Appl. No.: 12/069,911

(22) Filed: Feb. 13, 2008

(65) Prior Publication Data

US 2009/0200386 A1 Aug. 13, 2009

(51) Int. Cl.
G06K 19/06 (2006.01)
(52) U.S. Cl. ........................................ 235/494; 235/454
(58) Field of Classification Search .................. 235/454, 235/494
See application file for complete search history.

(56) References Cited

U.S. PATENT DOCUMENTS

| | | | |
|---|---|---|---|
| 4,263,504 A * | 4/1981 | Thomas | 235/454 |
| 4,567,361 A | 1/1986 | Rosenthal | |
| 5,304,786 A | 4/1994 | Pavlidis et al. | |
| 5,324,923 A * | 6/1994 | Cymbalski et al. | 235/454 |
| 5,329,107 A * | 7/1994 | Priddy et al. | 235/494 |
| 5,479,515 A | 12/1995 | Longacre, Jr. | |
| 5,504,322 A | 4/1996 | Pavlidis et al. | |
| 5,553,084 A | 9/1996 | Ackley et al. | |
| 5,612,524 A | 3/1997 | Sant'Anselmo et al. | |
| 5,619,027 A | 4/1997 | Ackley | |
| 5,675,137 A | 10/1997 | van Haagen et al. | |
| 5,761,219 A | 6/1998 | Maltsev | |
| 5,811,787 A | 9/1998 | Schuessler et al. | |
| 5,939,700 A | 8/1999 | Ackley | |
| 5,959,285 A | 9/1999 | Schuessler | |
| 6,012,638 A | 1/2000 | Ackley et al. | |
| 6,024,289 A | 2/2000 | Ackley | |
| 6,047,892 A | 4/2000 | Schuessler et al. | |
| 6,061,005 A | 5/2000 | Van Rooyen et al. | |
| 6,126,074 A | 10/2000 | He et al. | |
| 6,149,059 A | 11/2000 | Ackley | |
| 6,186,406 B1 | 2/2001 | Ackley | |
| 6,321,986 B1 | 11/2001 | Ackley | |

(Continued)

OTHER PUBLICATIONS

Sklar, Bernard Reed-Solomon Codes, URL:www.informit.com/content/images/art_sklar7_reed-solomon/elementLinks/art_sklar7_reed-solomon.pdf, 33 pages.

*Primary Examiner* — Daniel A Hess
(74) *Attorney, Agent, or Firm* — Heslin Rothenberg Farley & Mesiti P.C.

(57) ABSTRACT

An optically readable two dimensional symbology employed to encode a string of characters belonging to a source string alphabet. The two dimensional symbol can comprise an ordered plurality of printable elements. The printable elements can be arranged in a rectangular array. The printable elements can be positioned on a grid diagonal to the longitudinal axis of the rectangular array, and sequenced according to a pre-defined pattern. Each character of the character string can be encoded into a sequence of printable elements using an encoding scheme comprising at least one code set. A code set can include a plurality of bit sequences. Each bit sequence can correspond to a group of one or more characters of the source string alphabet. Each bit sequence can comprise one or more binary digits. The first binary digit can be encoded by a printable element printed in a printable element position, and a second binary digit can be encoded by a vacant printable element position.

30 Claims, 7 Drawing Sheets

U.S. PATENT DOCUMENTS

| | | | |
|---|---|---|---|
| 6,330,972 | B1 | 12/2001 | Wiklof et al. |
| 6,478,223 | B1 | 11/2002 | Ackley |
| 6,560,741 | B1 | 5/2003 | Gerety et al. |
| 6,601,772 | B1 | 8/2003 | Rubin et al. |
| 6,631,843 | B2 | 10/2003 | Schuessler |
| 6,732,932 | B2 | 5/2004 | Schuessler et al. |
| 6,761,314 | B2 | 7/2004 | Schuessler |
| 6,802,449 | B2 | 10/2004 | Schuessler |
| 6,802,454 | B1 * | 10/2004 | McMurtry et al. ............ 235/494 |
| 6,830,197 | B2 | 12/2004 | Rubin et al. |
| 6,834,803 | B2 | 12/2004 | Schuessler |
| 6,840,450 | B2 | 1/2005 | Schuessler |
| 6,942,159 | B2 | 9/2005 | Couvelaere et al. |
| 7,083,108 | B2 * | 8/2006 | Silverbrook et al. ......... 235/494 |
| 7,108,184 | B2 | 9/2006 | Mase et al. |
| 7,124,947 | B2 | 10/2006 | Storch |
| 7,185,816 | B1 | 3/2007 | Shoobridge |
| 7,213,760 | B2 | 5/2007 | Mase et al. |
| 2001/0045461 | A1 | 11/2001 | Schuessler |
| 2002/0056759 | A1 | 5/2002 | Schuessler |
| 2002/0121553 | A1 | 9/2002 | Schuessler |
| 2002/0125330 | A1 | 9/2002 | Schuessler et al. |
| 2004/0084540 | A1 | 5/2004 | Schuessler |
| 2004/0195335 | A1 | 10/2004 | Schuessler |
| 2005/0029354 | A1 | 2/2005 | Frantz et al. |
| 2006/0049260 | A1 * | 3/2006 | Takahashi et al. ............ 235/454 |
| 2007/0069028 | A1 | 3/2007 | Nemet |
| 2007/0125861 | A1 | 6/2007 | Shoobridge |
| 2007/0125862 | A1 * | 6/2007 | Uchiyama et al. ....... 235/462.09 |
| 2008/0035730 | A1 | 2/2008 | Look |
| 2008/0245869 | A1 * | 10/2008 | Berkun et al. ............. 235/462.1 |
| 2009/0283589 | A1 * | 11/2009 | Moore et al. .................. 235/382 |

* cited by examiner

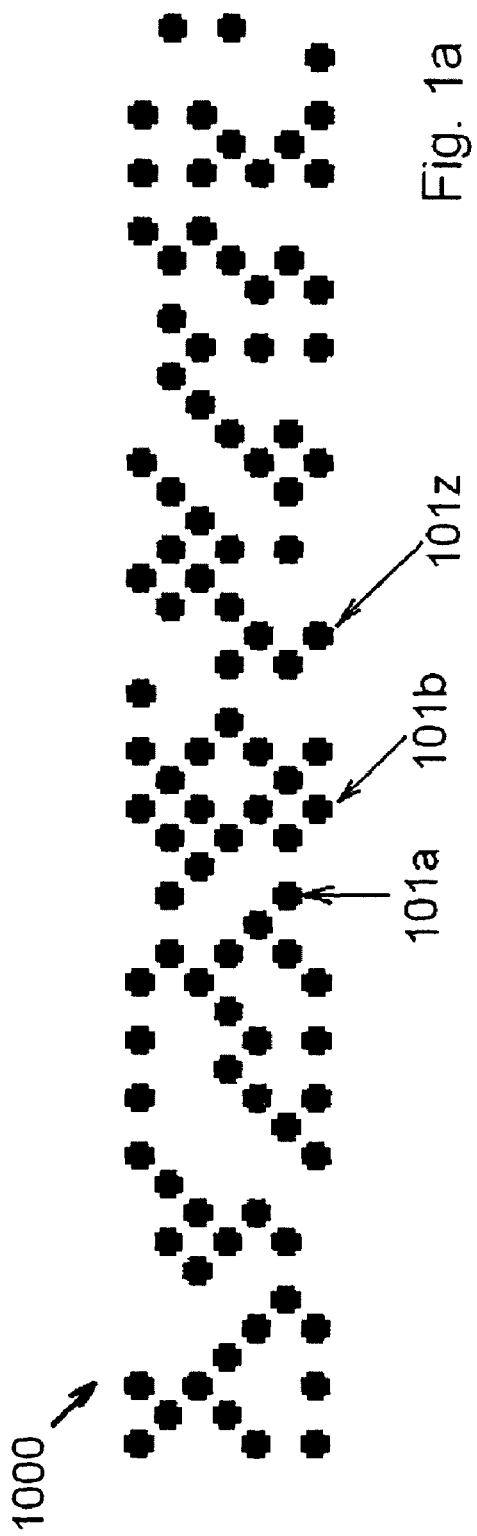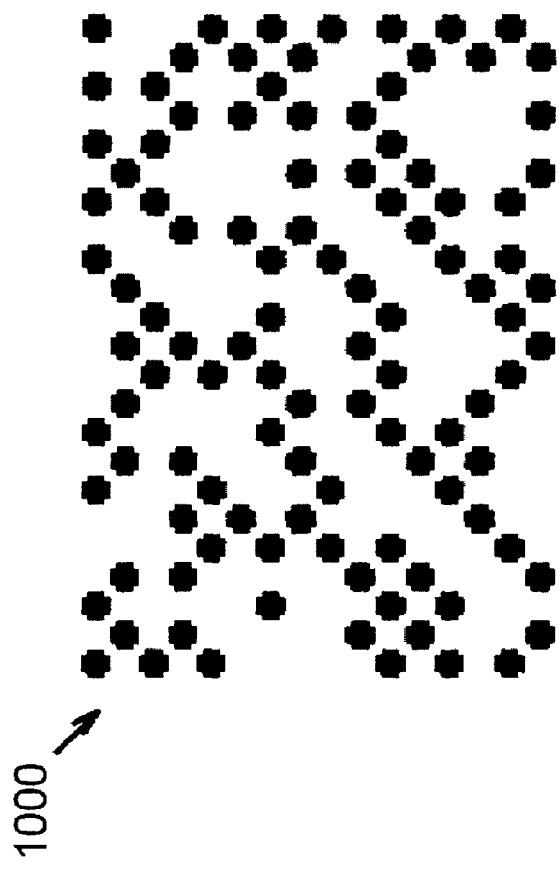

| Codeword | In the first data position | | In subsequent data positions | |
|---|---|---|---|---|
| 97 | ()>$^R_s$05$^G_s$ ... $^R_s$$^E$o$_T$ | | FS | 28 |
| 98 | ()>$^R_s$06$^G_s$ ... $^R_s$$^E$o$_T$ | | GS | 29 |
| 99 | ()>$^R_s$12$^G_s$ ... $^R_s$$^E$o$_T$ | | RS | 30 |
| 100 | ()>$^R_s$xx$^G_s$ ... $^R_s$$^E$o$_T$ where "xx" is the value of the following codeword | | US | 31 |
| Note: these "Macro" expansions include both a header & trailer for the data | | | | |

504

| Codeword | Operation |
|---|---|
| 103 | Interrupt for 2x Shift C |
| 104 | Interrupt for 3x Shift C |
| 105 | Interrupt for 4x Shift C |
| 106 | Interrupt for 5x Shift C |
| 107 | Interrupt for 6x Shift C |
| 108 | Interrupt for 7x Shift C |
| 109 | Terminate with Latch to A |
| 110 | Terminate with Latch to B |
| 111 | Terminate with Latch to C |
| 112 | Terminate with Symbol Separation, Latch to C |

Fig. 5

MACHINE READABLE 2D SYMBOLOGY PRINTABLE ON DEMAND

FIELD OF THE INVENTION

This invention relates generally to machine readable symbology and in particular to providing a two dimensional machine readable symbology for on-demand printing of variable data.

BACKGROUND OF THE INVENTION

There is an increasing interest in printing machine-readable variable data, including time-dependent data (e.g., a freshness date) and serialized data (e.g., a lot number) on retail items. One way of printing time-dependent data at production line speeds is ink jet or laser printing (e.g., printing lot number and date on cans and bottles). However, the dimensional imprecision of the resulting labels inhibits robust automatic data capture.

Several "dot codes" are known in the art which define symbols composed by multiple dots. However, the symbols defined by the known "dot codes" are generally of a square form, with heights exceeding the limits supported by high speed ink jet printers. Although not technically a dot code, but sometimes printed as one, Data Matrix ECC 200 bar code includes several versions with the symbol height being 8 and 16 dots, but the symbols have fixed limited length and hence limited data capacity, and also are not fundamentally tolerant to printing irregularity.

Hence, a need exists to provide a machine-readable two-dimensional symbology with a limited symbol height. There is a further need to provide a machine-readable two dimensional symbology the design features of which assure that the symbol orientation can be unambiguously determined. There is a further need to provide a machine-readable two dimensional symbology which is robust and secure when printed by high-speed inkjet or laser dot printers.

SUMMARY OF THE INVENTION

An optically readable two dimensional symbology employed to encode a string of characters belonging to a source string alphabet. The two dimensional symbol can comprise an ordered plurality of printable elements. The printable elements can be arranged in a rectangular array. The printable elements can be positioned on a grid diagonal to the longitudinal axis of the rectangular array, and sequenced according to a pre-defined pattern. Each character of the character string can be encoded into a sequence of printable elements using an encoding scheme comprising at least one code set. A code set can include a plurality of bit sequences. Each bit sequence can correspond to a group of one or more characters of the source string alphabet. Each bit sequence can comprise one or more binary digits. The first binary digit can be encoded by a printable element printed in a printable element position, and a second binary digit can be encoded by a vacant printable element position.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIGS. 1a-1b illustrate an example of a two-dimensional DotCode symbol according to the invention.

FIG. 4 illustrates an encoding table according to the invention.

FIG. 5 illustrates a table of Code Set B dual function codewords according to the invention and;

FIG. 5 illustrates a table of binary mode non-data codewords according to the invention.

DETAILED DESCRIPTION OF THE INVENTION

There is provided a two dimensional machine-readable symbology, hereinafter referred to as DotCode, for encoding messages represented by character strings. DotCode is an optical data carrier encoding a character string into an ordered plurality of printable elements arranged in a rectangular array at selected locations within a regular grid of possible locations, in which all printable element positions are variable data positions.

In one embodiment, the printable elements can be represented by circular dots, although a skilled artisan would appreciate the fact that other form factors of the printable elements are within the scope and spirit of the invention. Since the printable elements are arranged on a regular grid, as little as a half of the possible element locations need to be actually occupied by printed elements in order for the grid, size and shape of the symbol to be optically recognizable.

In one embodiment, the character string to be encoded can comprise one or more characters belonging to a source string alphabet, e.g., ASCII, UNICODE, EBCDIC, ISO/IEC 8859-1, etc. In one embodiment, the character string can be provided by a binary stream, in which case the source string alphabet can be defined, e.g., as comprising 256 binary octets (bytes) of 8 bits each with decimal values from 0 to 255, or 16 binary quadruplets of 4 bits each with decimal values from 0 to 15, etc. In a yet another embodiment, the character string can be empty, i.e., comprise zero characters.

A skilled artisan would appreciate the fact that other implementations of source string alphabet are within the scope and the spirit of the invention.

For each of one or more groups of at least one character of the source string alphabet, a binary representation provided by a bit sequence can be selected in accordance with a pre-defined code set. One or more code sets can be joined to compose a binary encoding scheme. The binary representations of the source string characters can then be translated into one or more DotCode symbols.

Figure 2:
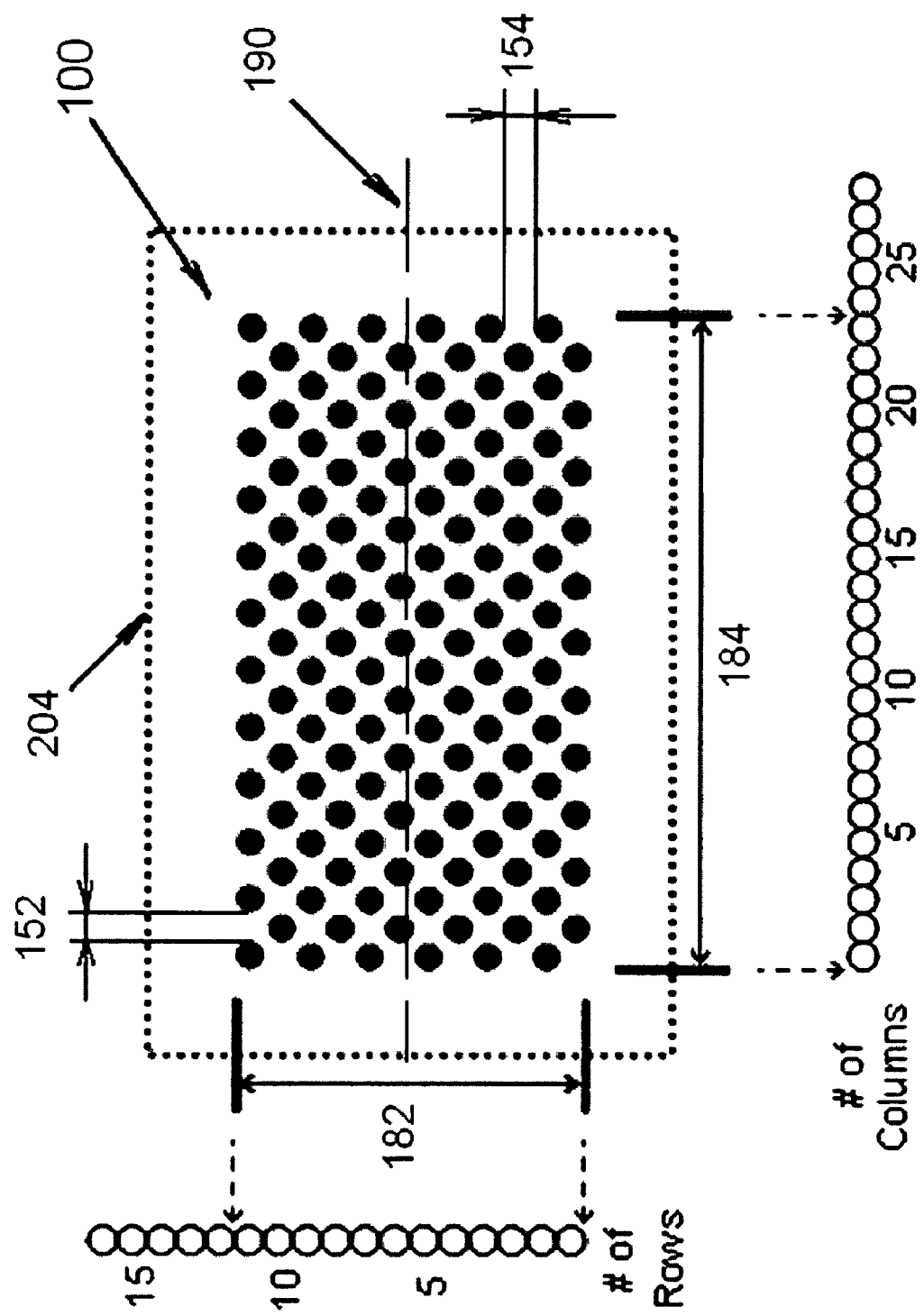
FIG. 2 illustrates a layout of a two-dimensional DotCode symbol according to the invention.

FIGS. 1a and 1b each illustrate an example of a two-dimensional DotCode symbol according to the invention. DotCode symbol 1000 can comprise an ordered plurality of printable elements 101a-101z. In one embodiment, the printable elements 101a-101z can have a form factor of circular dots. The printable elements 101a-101z can be arranged in a rectangular array 100. In one aspect, best viewed in FIG. 2, the printable elements 101a-101z can be positioned in a checker board-like manner on a grid which is diagonal to the longitudinal axis 190 of the rectangular array 100. The longitudinal axis 190 is shown in FIG. 2 for illustration purposes only; it is not printed in real-life applications.

In one aspect, the rectangular array can have two dimensions: height 182 and width 184, measured in the number of rows and columns respectively. The rows can be substantially parallel, while the columns can be substantially orthogonal, to the longitudinal axis 190. An intersection of a row and a column can define either a printable element position, or a space between two printable elements, as shown in FIG. 2 which illustrates a layout of 12-row tall by 23-column wide DotCode symbol, in which every column has 6 locations available for printable elements, and every row has alternately 11 or 12 locations available for printable elements. Each printable element position can either be occupied by a printed printable element, or remain vacant. The neighboring printable element positions within the same row or column can be spaced apart by horizontal 152 and vertical 154 spaces of a pre-defined size. In one embodiment, the space size can be nominally equal to the printable element diameter, and hence, the printable elements can stay nominally disconnected providing internal clocking information needed for the DotCode symbol decoding.

In another aspect, the rectangular array can be surrounded by the quiet zones 202a-202d provided by clear areas of the background color. In one embodiment, the quite zones can have a width approximately three times exceeding the size of the row or column spacing. The border 204 defining the quite zones is shown in FIG. 2 for illustration purposes only, and does not have to be printed in real-life applications.

Therefore, all printable element positions in a DotCode symbol can be variable data positions, i.e., the DotCode symbol design does not prescribe any pre-defined patterns provided by the printable elements. Instead, all the fixed patterns in a DotCode symbol can be provided by the spaces between the printable elements, and the quite zones.

In a further aspect, for facilitating the unambiguous determination by a reader device of a DotCode symbol spatial orientation, the rectangular array can have an odd sum of the two dimensions, i.e., when the height is even then the width is odd, and vice versa. This rule always produces an array in which two "neighboring" corner positions are printable element positions, and thus can be occupied by printable elements, while the opposite to corner positions are inter-element space positions, and thus can never be printed upon. In the example shown in FIG. 2, the upper two corners of the rectangular array are printable element positions, while the lower two corners are inter-element space positions.

In another aspect, the rectangular array can have its first dimension to be a pre-defined value, while the second array dimension can depend upon the character string size. In one embodiment, the rectangular array can have a pre-defined height and a variable width, thus having a ribbon-like form. The height can be within the range from seven to a maximum number of elements which can be printed by a printing apparatus.

In another aspect, the rectangular array can have a pre-defined height-to-width aspect ratio. For example, FIG. 1b illustrates a DotCode symbol having a height-to-width aspect ratio of 2:3. A skilled artisan would appreciate the fact that DotCode symbols can take on a variety of overall shapes, as can be dictated by the printer characteristics or by the space available for printing the DotCode symbol.

In another aspect, the printable elements can be sequenced according to a pre-defined pattern. In one embodiment, the printable elements can be sequenced according to a pre-defined direction along the rows or the columns of the rectangular array.

Figure 3B:
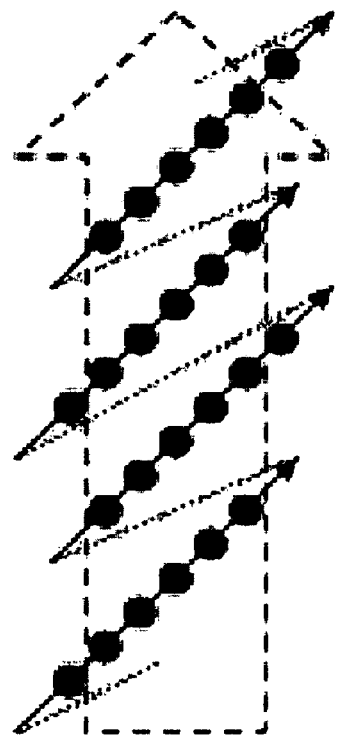
FIG. 3 illustrates an example of sequencing printable elements within a two-dimensional DotCode symbol according to the invention.
Figure 3A:
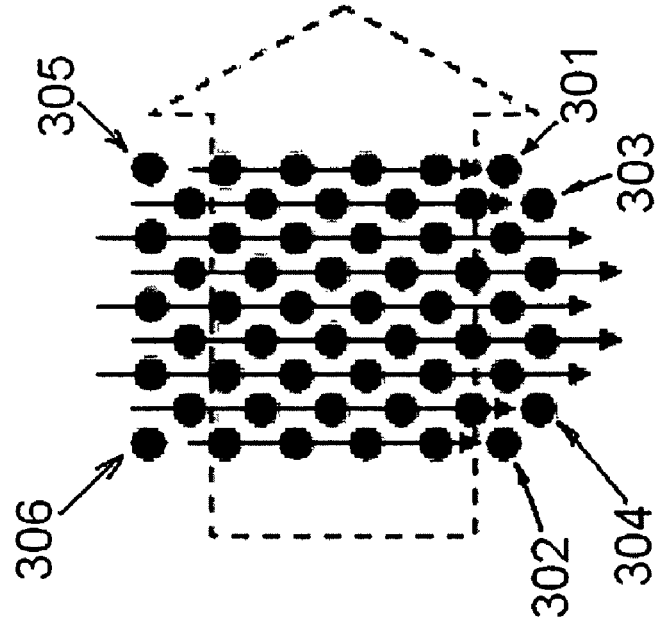

In the preferred embodiment, shown in the example of FIG. 3a, the printable elements can be sequenced along the dimension having an even value, starting from the leftmost or the bottommost corner printable element, depending upon the DotCode symbol orientation. For a DotCode symbol having even-sized columns, the sequencing can be defined as starting from the leftmost corner printable element and going down the columns. For a DotCode symbol having even-sized rows, the sequencing can be defined as starting from the bottommost corner printable element and going along the rows.

Figure 3C:
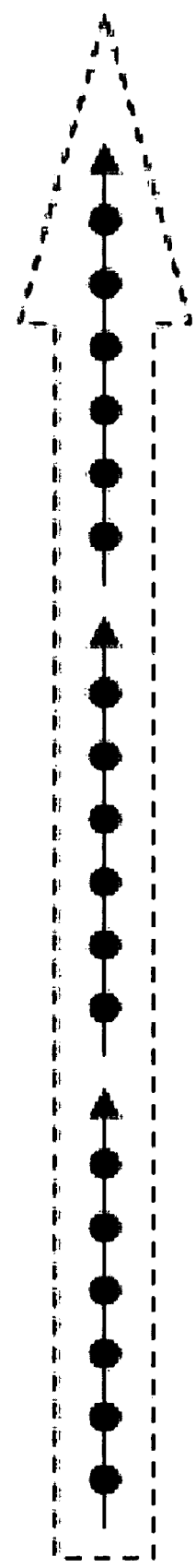

FIGS. 3b and 3c illustrate transforming a multitude of rectangular array elements into a linear sequence of bits.

In another embodiment, the printable elements can be sequenced in the opposite directions along the adjacent rows or columns of the rectangular array. In a yet another embodiment, the printable elements can be sequenced following a spiraling pattern. A skilled artisan would appreciate the fact that other sequencing schemes are within the spirit and the scope of the invention.

In a further aspect, the sequence of the printable elements can initially skip the six corner printable element locations 301-306, which can then be appended to the end of the sequence. Since, as described in details herein infra, the trailing positions of an encoded character string are very probably occupied by filling printable elements, this sequencing arrangement would increase the probability that the six corner locations will be occupied by printable elements rather than by vacant printable element positions, which can be useful for successful decoding of the DotCode symbol.

In a further aspect, a data bit can be encoded either by printing a printable element (e.g., a circular dot) in a printable element position defined by an intersection of a row and a column, or leaving the printable element position vacant. In one embodiment, one binary digit (e.g., 0) can be encoded by a vacant printable element position, while the other binary digit (e.g., 1) can be encoded by a printable element printed in the printable element position.

In one embodiment, DotCode elements can be printed as dark dots on a light background. In another embodiment, DotCode elements can be printed as light dots on a dark background. A skilled artisan would appreciate the fact that using more than one color for printing the printable elements and/or more than one background color is within the scope and the spirit of the invention.

In another aspect, for each of one or more groups of at least one character of the source string alphabet, a binary representation provided by a bit sequence can be selected in accordance with a pre-defined code set. The bit sequence can include one or more binary digits belonging to a binary alphabet which can comprise two binary digits (e.g., 0 and 1). In one embodiment, the bit sequence can include a pre-defined number of binary digits. One or more code sets can be joined to compose a binary encoding scheme.

Figure 4:
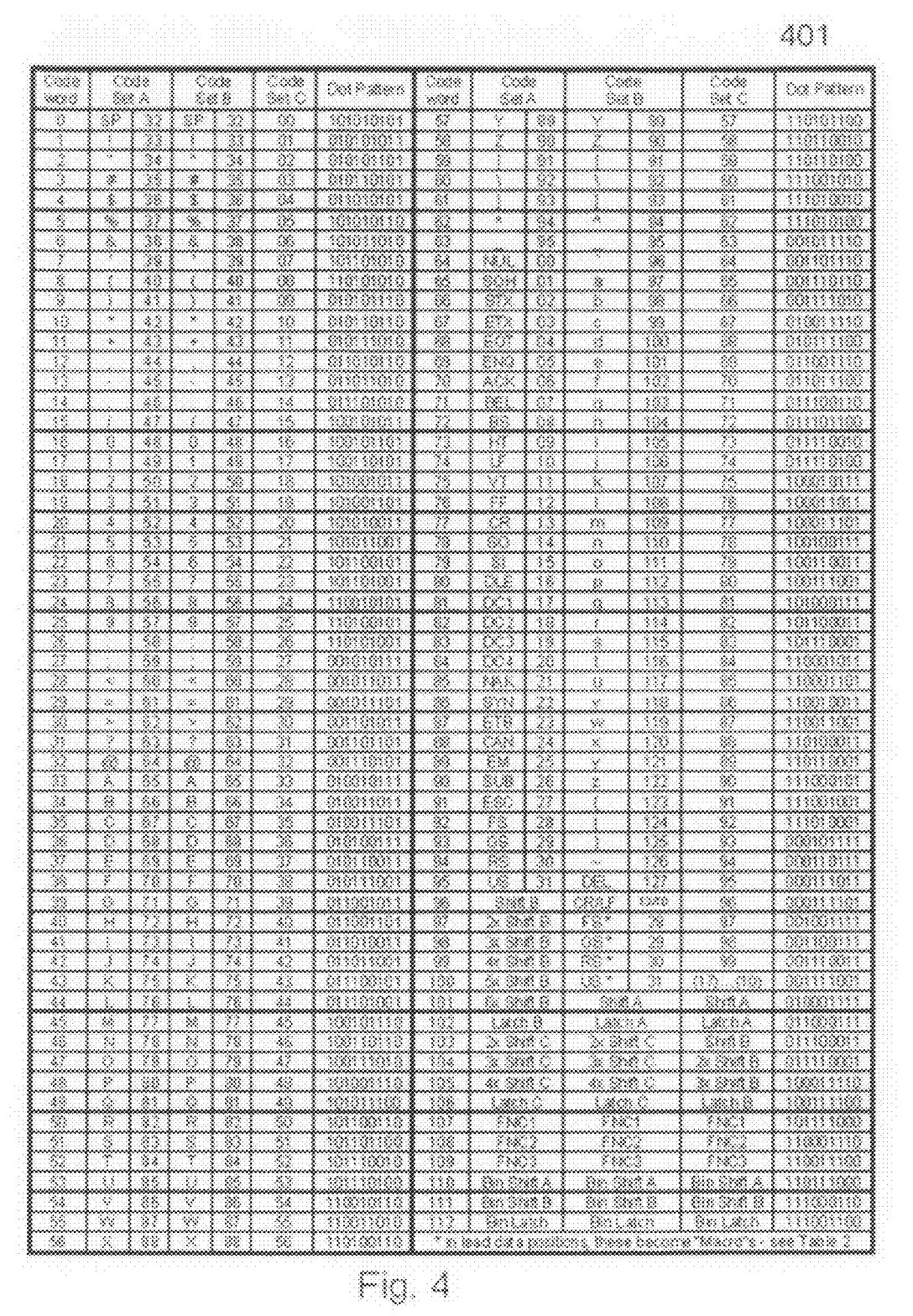

The encoding scheme that is preferred for use with the symbology of the invention is now being described with references to FIG. 4. The encoding scheme shown in the coding Table 401 in FIG. 4 has been partially adapted from Code 128. A skilled artisan would appreciate the fact that other encoding schemes providing for at least approximately half of the printable element locations to be occupied by printable elements rather than by vacant printable element positions are within the scope and the spirit of the invention.

The coding table 401 includes a first column labeled "Codeword," every row of which contains a DotCode codeword decimal value. The next three columns, labeled "Code Set A," "Code Set B," and "Code Set C," respectively, contain graphical and ASCII representations of ASCII characters encoded by the codeword of the first column. The last column, labeled "Dot Pattern," contains a 5-of-9 bit pattern encoding the codeword of the first column.

DotCode can employ a codeword set comprising 113 codewords which can be encoded by selected 5-of-9 bit patterns. In order to improve the DotCode symbol readability, the 5-of-9 bit patterns with maximum possible number of internal 0-1 and 1-0 transitions can be selected to represent DotCode codewords.

DotCode can encode sequences of ASCII characters having decimal values between 0 and 127, and three special characters FNC1, FNC2, and FNC3. Extended ASCII characters (having decimal values between 128 and 255) can be encoded using special binary modes.

DotCode can comprise three code sets designated Code Set A, Code Set B, and Code Set C. In Code Set A, codewords 0 through 63 can be used to encode ASCII characters having decimal values 32 through 95 (the "teletype" subset of ASCII), while codewords 64 through 85 can be used to encode ASCII characters having decimal values 0 through 31 (control characters).

In Code Set B, codewords 0 through 95 can be used to encode ASCII characters having decimal values 32 through 127 (the "teletype" subset plus the lowercase alphabet characters). In addition, codeword 96 can be used to encode <CR/LF> ('Carriage Return/Line Feed') control sequence of two characters having ASCII codes 13 and 10 respectively, and codewords 97 through 100 can server dual functions as shown in Table 502 of FIG. 5.

In Code Set C, codewords 0 thorough 99 can be used to encode groups of two ASCII characters having decimal values 48 through 57 (digits '0'-'9'): from "00" through "99". Codeword 100 can be used to encode the character sequence of "17xxyyzz10" where xx, yy and zz are three pairs of decimal digits which can be specified immediately after the codeword 100.

Each code set can include zero or more special characters. In Code Set A, the special characters can be encoded by codewords 96 through 112. In Code Sets B and C, the special characters can be encoded by codewords 101 through 112. The functions of the special characters will now be described.

Binary Shifts A and B can cause interpreting one or more codewords immediately following the binary shift control character as being encoded in Code Set A or B respectively, but with the most significant bit set, thus encoding ASCII characters with decimal values 128 through 255 (extended ASCII). The number of affected codewords can be specified by the nX designator as shown in Table 401 of FIG. 4, wherein n specifies the number of codewords. After processing n codewords, the Code Set can automatically revert back to that from which the Shift occurred.

Binary Latch can cause interpreting the codewords immediately following the binary latch control character as composing a binary stream comprising a plurality of 8-bit characters. A group of six codewords having decimal values between 0 and 102 can be converted from radix 103 into five radix-259 values, each radix-259 value representing either an 8-bit character (0 to 255) or an Extended Character Interpretation (ECI) escape sequence (256 to 258), where the ECI value can be represented by the following one, two or three bytes respectively. The binary stream can be interrupted, terminated, or run to the end of data. In any case the two to five remaining "dangling" codewords, if present, shall be converted into one to four radix-259 characters respectively, in a manner similar to the radix conversion described herein supra. The binary stream can be interrupted or terminated by a codeword having a decimal value 102 or more, as shown in Table 504 of FIG. 5.

The three special FNC characters can provide functionality which is similar to Code 128 FNC characters, with generally expanded capabilities. FNC1 (Format Identifier) special character can be used to identify various industry data formats. An FNC1 special character encoded in the first character position can identify a symbol having a generic data format. An FNC1 special character immediately following a leading pair of digits or single letter can identify a symbol whose data conform to an industry standard. FNC1 special characters encoded in any later position in the encoded character string are interpreted as ASCII character <GS> (decimal value 29).

FNC2 special character can signal the insertion of an Extended Character Interpretation (ECI) sequence or cause a message to be appended to a multi-message sequence, as described in detail herein infra:

a. ECI Support. In any position except at the end of the data, a FNC2 special character can signal the insertion of an ECI sequence conforming to the pattern of: \xxxxxx where the x's are six digits having a decimal value between 000000 and 811799 which is represented in the one or three codewords immediately following the FNC2 special character. If the codeword immediately following the FNC2 special character has a decimal value of less than 49, the codeword can directly encode an ECI value; otherwise, the immediately following FNC2 special character three codewords having values of A, B, and C can encode an ECI value of (A−49)*12769+B*113+C+49. The ECI protocol providing a consistent method to specify particular interpretations of byte values before printing and after decoding is fully specified in *AIM Inc. International Technical Specification—Extended Channel Interpretations Part 1*.

b. Structured Append. If the FNC2 special character is in the final data position, then the preceding two characters can designate, using either numbers or letters, the ordinal number of the message in a multi-message sequence, and the total number of messages in the sequence.

FNC3 special character can signal either start of a reader apparatus initialization or reprogramming sequence, or act as a message separator, as described in detail herein infra:

a. (Reader Initialization/Reprogramming) If the FNC3 special character is found in the leading position of the decoded character string, it can cause a reader apparatus to interpret the immediately following data as instructions for initialization or reprogramming of the reader apparatus, so that the decoded character string should be interpreted and processed by the reader apparatus without transmitting the decoded character string.

b. (Message Separation) If the FNC3 special character is found in any non-leading position of the decoded character string, it can act as a message separator, thus causing two distinct messages to be transmitted by the reader apparatus. The encoded data following the FNC3 special character can be interpreted as if it appeared at the very start of a new DotCode symbol, starting in Code Set C and defaulting to GS1 format.

In another aspect, the number of codewords in the encoded character string can be minimized, thus minimizing the number of printable elements in the resulting DotCode symbol, since DotCode encoding scheme allows encoding the same character string by different sets of DotCode codewords through the use of different combinations of Code Set and Shift special characters which prescribe switching to a Code Set different from the current code set. In one embodiment, the rules minimizing the number of codewords employed to encode a given character string can be implemented in firmware of a DotCode-capable printer.

In another aspect, the size of a DotCode symbol necessary to accommodate the codeword sequence representing the encoded character string can be calculated. In one embodiment, the total number of codewords needed to represent a character string encoded by ND data codewords, can be calculated as follows:

$$CW=ND+NC,$$

where CW is the number of codewords,
ND is the number of data codewords, and
NC is the number of error correction characters.

In the preferred embodiment, the error correction can be implemented using the Reed-Solomon error correction encoding, according to which $$NC=3+(ND \text{ div } 2)$$

where div designates the integer division operator.

In the preferred embodiment, each of data and check codewords require nine printable elements for encoding. In addition, two printable elements can designate a bit scrambling mask, as described in details herein infra. Thus, the DotCode symbol should be capable to accommodate at least:

$$\text{MinDots}=9 \times (ND+3+(ND \text{ div } 2))+2$$

where MinDots is the minimal number of elements to be accommodated by the DotCode symbol.

In the preferred embodiment, the printable elements can occupy only a half of the array locations, thus the following condition must be satisfied:

$$\text{MinDots} \times 2 <= H \times W$$

In one embodiment, the DotCode symbol height can be a pre-defined value, thus the width can be calculated as follows:

$$W=(\text{MinDots} \times 2 + (H-1)) \text{ div } H$$

The value of the DotCode symbol width yielded by the above formula may need to be incremented by one in order to satisfy the requirement that the sum of the two dimensions of the DotCode symbol must be an odd number.

In another embodiment, the DotCode symbol width can be a pre-defined value, thus the height can be calculated as follows:

$$H=(\text{MinDots} \times 2 + (W-1)) \text{ div } W$$

The value of the DotCode symbol height yielded by the above formula may need to be incremented by one in order to satisfy the requirement that the sum of the DotCode symbol's two dimensions must be an odd number.

In another embodiment, the aspect ratio of the DotCode symbol height to width can be a pre-defined value, thus the height and the width of the DotCode symbol can be calculated as follows:

$$H=\text{int}(\sqrt{\text{MinArea} \times A/B})$$

$$W=\text{int}(\sqrt{\text{MinArea} \times B/A})$$

where int designates the integer part of the operator's rational argument,
and A/B is the aspect ratio of the DotCode symbol height to width.

The values of the DotCode symbol height and/or width yielded by the above formula may need to be adjusted in order to satisfy the requirement that the sum of the DotCode symbol's two dimensions must be an odd number, and the condition requiring that the product of height and width exceeded the value of the double minimal number of elements to be accommodated by the DotCode symbol.

In the preferred embodiment, the DotCode symbol can have a pre-defined odd-sized dimension, while the even-sized dimension can be depending upon the size of the character string to be encoded, thus making the resulting DotCode symbol much more tolerant to printing errors that could destroy an entire row or column of printable elements (e.g., plugging of a single printing nozzle), since rows or columns of even size can provide a better tolerance to printing defects without compromising the overall symbol readability.

In another aspect, the encoded character string can be padded by appending one or more dummy codewords to the encoded character string, in order to utilize all the $$(\text{Height} \times \text{Width})/2$$

printable characters within a DotCode symbol of a given size. In one embodiment, one or more dummy latch characters can be appended to the sequence of codewords by latching to Code Set A (by appending a codeword value 109), if the encoded data ended in the binary mode. Then successive latches between Code Sets A and B (by appending a codeword value 102) are added as needed.

In another aspect, in order improve the DotCode symbol readability, a bit scrambling operation can be performed, by adding successive multiples of a pre-defined integer value to each byte of the encoded message, and then by calculating a modulo n of the result, where n is a pre-defined prime number, e.g., 113. In the preferred embodiment, the step of bit scrambling can follow the step of message padding described herein supra. The pre-defined integer can be selected from an array of four pre-defined integer values, and the index in the array, referred to as a bit scrambling mask, can be specified by a sequence of two binary digits (00, 01, 10, and 11) that are encoded in two leading positions of the resulting DotCode symbol.

In another aspect, a DotCode symbol can contain encodings of one or more error correction characters. In the preferred embodiment, the error correction character computation follows the step of bit scrambling. For a DotCode symbol encoding ND message data characters, $$NC=3+(ND \text{ div } 2)$$

error correction characters can be computed using Reed-Solomon error correction encoding within the prime Galois Field GF(113) with a prime modulus of 3. The encodings of the NC error correction characters can be appended to the ND message data characters, so that the entire codeword stream would contain $$NW=1+ND+NC$$

codewords.

In a further aspect, since Reed-Solomon error blocks are generally limited in size to the Galois Field size minus 1, i.e., $$1+ND+NC<=GF-1,$$

then two or more equally-sized interleaved blocks of data and error correction characters can be created when the number of the encoded data characters plus the number of the error correction characters exceeds the Galois Field size.

A skilled artisan would appreciate the fact that other error checking schemes can be employed by DotCode without departing from the scope and the spirit of the invention.

In another aspect, a DotCode symbol can be formed after completing the step of calculating the error correction characters. In the preferred embodiment, the DotCode symbol can be composed by a stream of (Height*Width)/2 printable elements comprising:

two printable elements identifying the bit scrambling mask;

nine printable elements representing each of message characters, padding characters, and error correction characters;

zero or more printed elements to fill out the unused printable element positions in the DotCode symbol.

The printed elements composing the DotCode symbol can be arranged into the rectangular array according to the rules described herein supra.

In another aspect, the steps of bit scrambling, error correction character calculation, and forming a DotCode symbol can be repeated a pre-defined number of times, each time selecting from the pre-defined array of integers the next integer value the successive multiples of which are added to every byte of the encoded message, as described herein supra. In the preferred embodiment, after completing each iteration, the value of bit scrambling mask can be incremented by 1, and the DotCode symbol's quality metric can be calculated. Upon completing the pre-defined number of iterations, the DotCode symbol with the best quality metrics can be selected for printing. In the preferred embodiment, the symbol quality metric can be based upon at least one of the following two criteria:

a. maximizing the number of printed elements along all four edges of the rectangular array.

b. minimizing the number of elements in one or more largest clear (unprinted) regions within the dot array.

Figure 6:
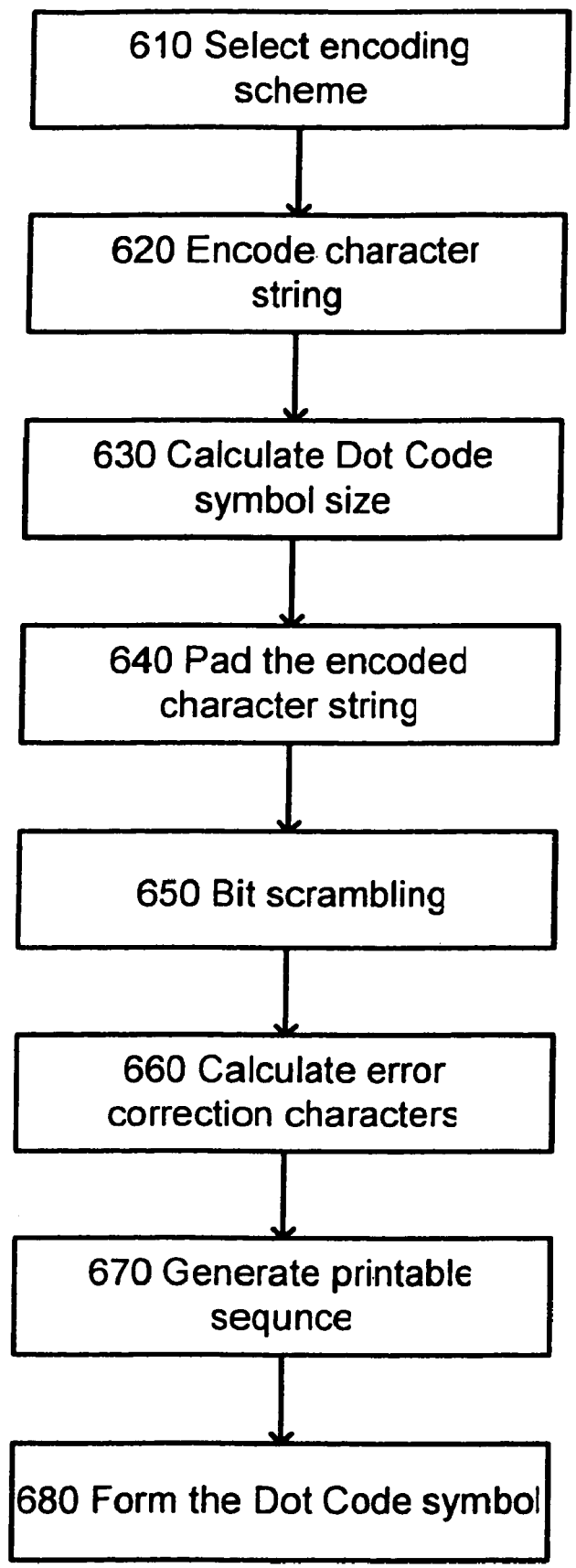
FIG. 6 illustrates a flowchart of a method of converting a character string into an optically readable DotCode symbol according to the invention.

A method of converting a character string into an optically-readable DotCode symbol according to the invention is now being described with references to the flow chart shown in FIG. 6.

In one embodiment, the character string to be encoded can comprise one or more characters belonging to a source string alphabet, e.g., ASCII, UNICODE, EBCDIC, ISO/IEC 8859-1, etc. In one embodiment, the character string can be provided by a binary stream, in which case the source string alphabet can be defined, e.g., as comprising 256 binary octets (bytes) of 8 bits each with decimal values from 0 to 255, or 16 binary quadruplets of 4 bits each with decimal values from 0 to 15, etc. In a yet another embodiment, the character string can be empty, i.e., comprise zero characters.

At step 610, an encoding scheme is selected. In one embodiment, a plurality of bit sequences, each bit sequences representing a groups of at least one character of the source string alphabet, can compose a code set. One or more code sets can be joined to compose a binary encoding scheme. The encoding scheme that is preferred for use with the symbology of the invention is shown in the coding Table 401 of FIG. 4 and described herein supra. A skilled artisan would appreciate the fact that other encoding schemes are within the scope and the spirit of the invention.

At step 620, the character string can be encoded in accordance with the encoding scheme selected, to generate a sequence of codewords. In the preferred embodiment, the number of codewords in the encoded character string can be minimized, thus minimizing the number of printable elements in the resulting DotCode symbol, since DotCode encoding scheme allows encoding the same character string by different sets of DotCode codewords through the use of different combinations of Code Set and Shift special characters which prescribe switching to a Code Set different from the current code set. In one embodiment, the rules minimizing the number of codewords employed to encode a given character string can be implemented in firmware of a DotCode-capable printer.

At step 630, the size of a DotCode symbol necessary to accommodate the generated sequence of codewords, is calculated, using the formulas described in details herein supra.

At step 640, the encoded character string represented by the sequence of codewords can be padded by appending one or more dummy codewords to the encoded character string, in order to utilize all the printable characters within a DotCode symbol of a given size, as described in details herein supra.

At step 650, a bit scrambling operation can be performed, by adding successive multiples of a pre-defined integer value to each byte of the encoded character string represented by the sequence of codewords, and then calculating a modulo n of the result, where n is a pre-defined prime number, as described in details herein supra.

At step 660, one or more error correction characters can be calculated and appended to the encoded character string represented by the sequence of codewords. In the preferred embodiment, the error correction characters can be calculated using Reed-Solomon error correction encoding, as described in details herein supra.

At step 670, a sequence of printable elements can be generated, by encoding each binary digit in the sequence of codewords by either a printable element or a vacant printable element position, as described in details herein supra.

At step 680, the sequence of printable elements can be arranged in a rectangular array, as described in details herein supra, and the method illustrated by flowchart of FIG. 6 can terminate.

An example of creating a DotCode symbol is now being described with references to FIG. 7. The character string to be encoded in this example is "1701061510ABC123456" (excluding the double quote characters). The most efficient encoding produces the following sequence of ND=11 codewords:

100 01 06 15 105 33 34 35 12 34 56

3+(11 div 2)=8 error correction characters are appended to the above sequence, requiring a minimum total of 2+(9×(11+8))=173 printable elements in a minimum area of MinArea=346 printable element positions.

In order for the DotCode symbol to have an approximate height to width ratio of A:B=2:3, the height H and the width W of the DotCode symbol can be calculated as follows:

$$H=\sqrt{(MinArea*A/B)}=\sqrt{(346\times 2/3)}=15.1877,$$

hence the symbol's height can be selected to be equal to 15.

$$W=\sqrt{(MinArea*B/A)}\sqrt{(346\times 3/2)}=22.7816,$$

hence the symbol's width can be selected to be equal to 22.

Since the height is odd and the width is even, and since 15×22=330<346, the height and width can both be incremented to become 16 and 23, respectively.

The rectangular array of the calculated size can comprise (16×23)/2=184 printable element positions, which is 11 more than the minimum needed, so the encoding procedure can ascertain whether one or more a message padding characters will fit. If ND is increased to 12 characters, then the number of error correction characters NC would also increase to 3+(12 div 2)=9 error correction characters, adding two characters or 18 printable elements to the DotCode symbol, which is more than the selected array size. Thus, no padding characters need to be included into the symbol.

Next, the encoding procedure can compute the Reed-Solomon error correction characters and compose an array of printable elements for each of the four possible bit scrambling masks. To a data sequence of 12 data characters (the first being the bit scrambling mask value):

00 100 01 06 15 105 33 34 35 12 34 56 the Reed-Solomon error correction encoding in GF(103) adds 8 more error correction characters:

60 06 53 25 106 101 66 68 which then translates into the bit stream:
00-001111001-010101011-101011010-100101011-100011110-010010111- . . .

Figure 7A:
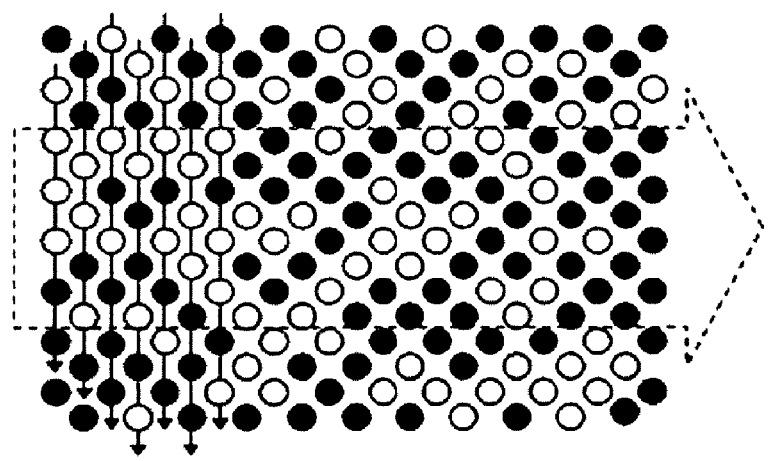
FIGS. 7a-7b illustrate DotCode symbols encoding the character string "1701061510ABC123456" according to the invention.

The bit stream in order to form a 16-row DotCode symbol gets re-parsed into the following sequence of columns:
000011/1100101/01010111/01011010/10010101/11000111/10010010/111 . . .

that ultimately form the dot array shown in FIG. 7a.

Figure 7B:
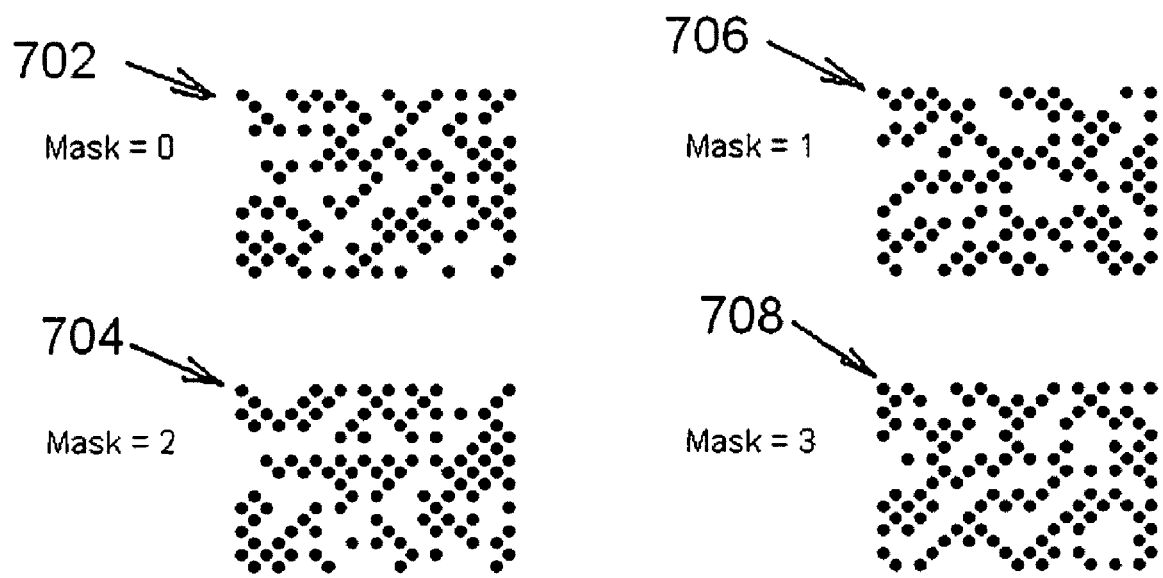

The steps of bit scrambling and error correction characters calculation can be repeated for each of the other three masks, resulting in the four possible DotCode symbols 702, 704, 706, and 708 shown in FIG. 7b. While each of these symbols can be readable, the DotCode symbol 708 with the bit scrambling mask=3 can be selected by the encoder applying a quality metric maximizing the number of printed elements along the edges of the DotCode symbol.

A small sample of systems methods and apparatus that are described herein is as follows:

A1. An optically readable two dimensional symbol employed to encode a string of characters, each character belonging to a source string alphabet, the two dimensional symbol comprising an ordered plurality of printable elements arranged in a rectangular array having a longitudinal axis, the rectangular array comprising a plurality of columns, each of the plurality of columns being substantially orthogonal to the longitudinal axis, the rectangular array further comprising a plurality of rows, each of the plurality of rows being substantially parallel to the longitudinal axis;

wherein the printable elements are positioned on a grid, the grid being diagonal to the longitudinal axis, each printable element occupying a printable element position defined by an intersection of a printable element row and a printable element column, each printable element position being spaced from neighboring printable element positions in one of: the printable element row, the printable element column, by a space of a pre-defined space size;

wherein the plurality of printable elements is sequenced according to a pre-defined pattern; and wherein each character of the character string is encoded into a sequence of printable elements using an encoding scheme comprising at least one code set, said at least one code set including a plurality of bit sequences, each bit sequence corresponding to a group of at least one character of the source string alphabet, each bit sequence comprising one or more binary digits, each binary digit selected from the group consisting of: a first binary digit encoded by a printable element printed in a printable element position and a second binary digit encoded by a vacant printable element position.

A2. The optically readable two dimensional symbol of claim A1, wherein each printable element of the plurality of printable elements has a form factor of a circular dot.

A3. The optically readable two dimensional symbol of claim A1, wherein the rectangular array has a first array dimension and a second array dimension, the sum of the first array dimension and the second array dimension being an odd number.

A4. The optically readable two dimensional symbol of claim A1, wherein the printable elements are sequenced in a pre-defined direction along one of: successive rows of the rectangular array, successive columns of the rectangular array.

A5. The optically readable two dimensional symbol of claim A1, wherein the rectangular array has a first array dimension having an even value and a second array dimension; and wherein the printable elements are sequenced along the first array dimension starting from one of: the leftmost corner element, the bottommost corner element.

A6. The optically readable two dimensional symbol of claim A1, wherein the printable elements belonging to one of: adjacent rows, adjacent columns, are sequenced in opposite directions.

A7. The optically readable two dimensional symbol of claim A1, wherein the printable elements are sequenced following a spiraling pattern.

A8. The optically readable two dimensional symbol of claim A1, wherein the source string alphabet is selected from the group consisting of: ASCII, UNICODE, EBCDIC.

A9. The optically readable two dimensional symbol of claim A1, wherein the source string alphabet includes at least one functional character.

A10. The optically readable two dimensional symbol of claim A1, wherein the character string has a character string size; and wherein the rectangular array has a first array dimension having a pre-defined value and a second array dimension, the second array dimension depending on the character string size.

A11. The optically readable two dimensional symbol of claim A1, wherein the rectangular array has a first array dimension and a second array dimension, an aspect ratio of the first array dimension to the second array dimension being a pre-defined value.

A12. The optically readable two dimensional symbol of claim A1, wherein a first plurality of the printable elements encode the characters of the character string and a second plurality of the printable elements encode at least one error correction character.

A13. The optically readable two dimensional symbol of claim A1, wherein a first plurality of the printable elements encode the characters of the character string and a second plurality of the printable elements encode one or more Reed-Solomon error correction characters.

A14. The optically readable two dimensional symbol of claim A1, wherein a first plurality of the printable elements encode the characters of the character string and a second plurality of the printable elements encode at least one dummy codeword.

B1. An optically readable two dimensional symbol employed to encode a string of characters, each character belonging to a source string alphabet, the two dimensional symbol comprising an ordered plurality of printable elements, the plurality of printable elements positioned in a plurality of printable element positions;

wherein all printable element positions of the plurality of printable element positions are variable data positions;

wherein the plurality of printable elements is sequenced according to a pre-defined pattern; and wherein each character of the character string is encoded into a sequence of printable elements using an encoding scheme comprising at least one code set, said at least one code set including a plurality of bit sequences, each bit sequence corresponding to a group of at least one character of the source string alphabet, each bit sequence comprising one or more binary digits.

B2. The optically readable two dimensional symbol of claim B1, wherein each binary digit selected from the group consisting of: a first binary digit encoded by a printable element printed in a printable element position and a second binary digit encoded by a vacant printable element position.

B3. The optically readable two dimensional symbol of claim B1, wherein the plurality of printable elements is arranged in a rectangular array having a longitudinal axis, the rectangular array comprising a plurality of columns, each of the plurality of columns being substantially orthogonal to the longitudinal axis, the rectangular array further comprising a plurality of rows, each of the plurality of rows being substantially parallel to the longitudinal axis.

B4. The optically readable two dimensional symbol of claim B1, wherein the plurality of printable elements is arranged in a rectangular array having a first array dimension and a second array dimension, the sum of the first array dimension and the second array dimension being an odd number.

B5. The optically readable two dimensional symbol of claim B1, wherein the printable elements are positioned on a grid, the grid being diagonal to the longitudinal axis, each printable element occupying a printable element position defined by an intersection of a printable element row and a printable element column, each printable element position being spaced from neighboring printable element positions in one of: the printable element row, the printable element column, by a space of a pre-defined space size.

B6. The optically readable two dimensional symbol of claim B1, wherein each printable element of the plurality of printable elements has a form factor of a circular dot.

C1. A method of converting a string of characters into an optically readable two dimensional symbol, each character belonging to a source string alphabet, the two dimensional symbol comprising an ordered plurality of printable elements, the method comprising the steps of:

selecting an encoding scheme comprising at least one code set, said at least one code set including a plurality of bit sequences, each bit sequence corresponding to a group of at least one character of the source string alphabet, each bit sequence comprising a pre-defined number of binary digits, each binary digit selected from the group consisting of: a first binary digit and a second binary digit;

generating a sequence of codewords, the sequence of codewords representing the character string according to the encoding scheme;

generating a sequence of printable elements by encoding each first binary digit in the sequence of codewords by a printable element printed in a printable element position and by encoding each second binary digit in the sequence of codewords by a vacant printable element position;

arranging the sequence of printable elements in a rectangular array having a longitudinal axis, the rectangular array comprising a plurality of columns, each of the plurality of columns being substantially orthogonal to the longitudinal axis, the rectangular array further comprising a plurality of rows, each of the plurality of rows being substantially parallel to the longitudinal axis, the printable elements being positioned on a grid, the grid being diagonal to the longitudinal axis, each printable element occupying a printable element position defined by an intersection of a printable element row and a printable element column, each printable element position being spaced from neighboring printable element positions in one of: the printable element row, the printable element column, by a space of a pre-defined space size, the printable elements being sequenced according to a pre-defined pattern.

C2. The method of claim C1, wherein the rectangular array has a first array dimension and a second array dimension, the sum of the first array dimension and the second array dimension being an odd number.

C3. The method of claim C1, wherein the printable elements are sequenced in a pre-defined direction along one of: successive rows of the rectangular array, successive columns of the rectangular array.

C4. The method of claim C1, wherein the rectangular array has a first array dimension having an even value and a second array dimension; and wherein the printable elements are sequenced along the first array dimension starting from one of: the leftmost corner element, the bottommost corner element.

C5. The method of claim C1, wherein the printable elements belonging to one of: adjacent rows, adjacent columns, are sequenced in opposite directions.

C6. The method of claim C1, wherein the printable elements are sequenced following a spiraling pattern.

C7. The method of claim C1, wherein the source string alphabet is selected from the group consisting of: ASCII, UNICODE, EBCDIC.

C8. The method of claim C1, wherein the source string alphabet includes at least one functional character.

C9. The method of claim C1, wherein the character string has a character string size; and wherein the rectangular array has a first array dimension having a pre-defined value and a second array dimension, the second array dimension depending on the character string size.

C10. The method of claim C1, wherein the rectangular array has a first array dimension and a second array dimension, an aspect ratio of the first array dimension to the second array dimension being a pre-defined value.

C11. The method of claim C1, wherein a first plurality of the printable elements encode the characters of the character string and a second plurality of the printable elements encode at least one error correction character.

C12. The method of claim C1, wherein a first plurality of the printable elements encode the characters of the character string and a second plurality of the printable elements encode one or more Reed-Solomon error correction characters.

C13. The method of claim C1, wherein a first plurality of the printable elements encode the characters of the character string and a second plurality of the printable elements encode at least one dummy codeword.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

The invention claimed is:

1. An optically readable two dimensional symbol employed to encode a character string each character belonging to a source string alphabet, the two dimensional symbol comprising an ordered plurality of printable elements arranged in a rectangular array having a longitudinal axis, the rectangular array comprising a plurality of columns, each of the plurality of columns being substantially orthogonal to the longitudinal axis, the rectangular array further comprising a plurality of rows, each of the plurality of rows being substantially parallel to the longitudinal axis;

wherein the printable elements are positioned in a checker board-like manner on a grid, the grid being diagonal to the longitudinal axis, wherein intersections between rows of the plurality of rows and columns of the plurality of columns define both printable element positions and spaces between printable element positions;

wherein two neighboring corner positions of the optically readable two dimensional symbol are printable element positions, and two positions opposite to the two neighboring corner positions are space positions; and wherein each character of the character string is encoded into a sequence of printable elements using an encoding scheme comprising at least one code set, said at least one code set including a plurality of bit sequences, each bit sequence corresponding to a group of at least one character of the source string alphabet, each bit sequence comprising one or more binary digits, each binary digit selected from the group consisting of: a first binary digit encoded by a printable element printed in a printable element position and a second binary digit encoded by a vacant printable element position.

2. The optically readable two dimensional symbol of claim 1, wherein each printable element of the plurality of printable elements has a form factor of a circular dot.

3. The optically readable two dimensional symbol of claim 1, wherein the rectangular array has a first array dimension and a second array dimension, and wherein a sum of the first array dimension and the second array dimension is an odd number.

4. The optically readable two dimensional symbol of claim 1, wherein the printable elements are sequenced in a pre-defined direction along one of: successive rows of the rectangular array, successive columns of the rectangular array.

5. The optically readable two dimensional symbol of claim 1, wherein the rectangular array has a first array dimension having an even value and a second array dimension; and wherein the printable elements are sequenced along the first array dimension starting from one of: a leftmost corner element, a bottommost corner element.

6. The optically readable two dimensional symbol of claim 1, wherein the printable elements belonging to one of: adjacent rows, adjacent columns, are sequenced in opposite directions.

7. The optically readable two dimensional symbol of claim 1, wherein the printable elements are sequenced following a spiraling pattern.

8. The optically readable two dimensional symbol of claim 1, wherein the source string alphabet is selected from the group consisting of: ASCII, UNICODE, EBCDIC.

9. The optically readable two dimensional symbol of claim 1, wherein the source string alphabet includes at least one functional character.

10. The optically readable two dimensional symbol of claim 1, wherein the character string has a character string size; and wherein the rectangular array has a first array dimension having a pre-defined value and a second array dimension, the second array dimension depending on the character string size.

11. The optically readable two dimensional symbol of claim 1, wherein the rectangular array has a first array dimension and a second array dimension, an aspect ratio of the first array dimension to the second array dimension being a pre-defined value.

12. The optically readable two dimensional symbol of claim 1, wherein a first plurality of the printable elements encode characters of the character string and a second plurality of the printable elements encode at least one error correction character.

13. The optically readable two dimensional symbol of claim 1, wherein a first plurality of the printable elements encode characters of the character string and a second plurality of the printable elements encode one or more Reed-Solomon error correction characters.

14. The optically readable two dimensional symbol of claim 1, wherein a first plurality of the printable elements encode the characters of the character string and a second plurality of the printable elements encode at least one dummy codeword.

15. The optically readable two dimensional symbol of claim 1, wherein alternating rows of the plurality of rows have unequal numbers of printable element positions.

16. A method of converting a character string into an optically readable two dimensional symbol, each character belonging to a source string alphabet, the two dimensional symbol comprising an ordered plurality of printable elements, the method comprising the steps of:

selecting an encoding scheme comprising at least one code set, said at least one code set including a plurality of bit sequences, each bit sequence corresponding to a group of at least one character of the source string alphabet, each bit sequence comprising a pre-defined number of binary digits, each binary digit selected from the group consisting of: a first binary digit and a second binary digit;

generating a sequence of code words, the sequence of code words representing the character string according to the encoding scheme;

generating a sequence of printable elements by encoding each first binary digit in the sequence of code words by a printable element printed in a printable element position and by encoding each second binary digit in the sequence of code words by a vacant printable element position;

arranging the sequence of printable elements in a rectangular array having a longitudinal axis, the rectangular array comprising a plurality of columns, each of the plurality of columns being substantially orthogonal to the longitudinal axis, the rectangular array further comprising a plurality of rows, each of the plurality of rows being substantially parallel to the longitudinal axis, the printable elements being positioned on a grid in a checker board-like manner, the grid being diagonal to the longitudinal axis, each printable element occupying a printable element position defined by an intersection of a printable element row and a printable element column, each printable element position being spaced from neighboring printable element positions, the printable elements being sequenced according to a pre-defined pattern wherein two neighboring corner positions of the rectangular array are printable element positions, and two positions opposite to the two neighboring corner positions are space positions.

17. The method of claim 16, wherein the rectangular array has a first array dimension and a second array dimension, sum of the first array dimension and the second array dimension is an odd number.

18. The method of claim 16, wherein the printable elements are sequenced in a pre-defined direction along one of: successive rows of the rectangular array, successive columns of the rectangular array.

19. The method of claim 16, wherein the rectangular array has a first array dimension having an even value and a second array dimension; and wherein the printable elements are sequenced along the first array dimension starting from one of: the leftmost corner element, the bottommost corner element.

20. The method of claim 16, wherein the printable elements belonging to one of: adjacent rows, adjacent columns, are sequenced in opposite directions.

21. The method of claim 16, wherein the printable elements are sequenced following a spiraling pattern.

22. The method of claim 16, wherein the source string alphabet is selected from the group consisting of: ASCII, UNICODE, EBCDIC.

23. The method of claim 16, wherein the source string alphabet includes at least one functional character.

24. The method of claim 16, wherein the character string has a character string size; and wherein the rectangular array has a first array dimension having a pre-defined value and a second array dimension, the second array dimension depending on the character string size.

25. The method of claim 16, wherein the rectangular array has a first array dimension and a second array dimension, an aspect ratio of the first array dimension to the second array dimension being a pre-defined value.

26. The method of claim 16, wherein a first plurality of the printable elements encode characters of the character string and a second plurality of the printable elements encode at least one error correction character.

27. The method of claim 16, wherein a first plurality of the printable elements encode characters of the character string and a second plurality of the printable elements encode one or more Reed-Solomon error correction characters.

28. The method of claim 16, wherein a first plurality of the printable elements encode characters of the character string and a second plurality of the printable elements encode at least one dummy codeword.

29. An optically readable two dimensional symbol employed to encode a character string each character belonging to a source string alphabet, the two dimensional symbol comprising an ordered plurality of printable elements arranged in a rectangular array having a longitudinal axis, the rectangular array comprising a plurality of columns, each of the plurality of columns being substantially orthogonal to the longitudinal axis, the rectangular array further comprising a plurality of rows, each of the plurality of rows being substantially parallel to the longitudinal axis, wherein intersections between rows of the plurality of rows and columns of the plurality of columns define both printable element positions and spaces between printable element positions;

wherein the printable elements are positioned on a grid, the grid being diagonal to the longitudinal axis, each printable element occupying a printable element position defined by an intersection of a printable element row and a printable element column, each printable element position being spaced from neighboring printable element positions;

wherein the plurality of printable elements is sequenced according to a pre-defined pattern; and wherein each character of the character string is encoded into a sequence of printable elements using an encoding scheme comprising at least one code set, said at least one code set including a plurality of bit sequences, each bit sequence corresponding to a group of at least one character of the source string alphabet, each bit sequence comprising one or more binary digits, each binary digit selected from the group consisting of: a first binary digit encoded by a printable element printed in a printable element position and a second binary digit encoded by a vacant printable element position; and wherein the printable elements are sequenced following a spiraling pattern.

30. A method of converting a character string into an optically readable two dimensional symbol, each character belonging to a source string alphabet, the two dimensional symbol comprising an ordered plurality of printable elements, the method comprising the steps of:

selecting an encoding scheme comprising at least one code set, said at least one code set including a plurality of bit sequences, each bit sequence corresponding to a group of at least one character of the source string alphabet, each bit sequence comprising a pre-defined number of binary digits, each binary digit selected from the group consisting of: a first binary digit and a second binary digit;

generating a sequence of code words, the sequence of code words representing the character string according to the encoding scheme;

generating a sequence of printable elements by encoding each first binary digit in the sequence of code words by a printable element printed in a printable element position and by encoding each second binary digit in the sequence of code words by a vacant printable element position;

arranging the sequence of printable elements in a rectangular array having a longitudinal axis, the rectangular array comprising a plurality of columns, each of the plurality of columns being substantially orthogonal to the longitudinal axis, the rectangular array further comprising a plurality of rows, each of the plurality of rows being substantially parallel to the longitudinal axis, wherein intersections between rows of the plurality of rows and columns of the plurality of columns define both printable element positions and spaces between printable element positions, the printable elements being positioned on a grid, the grid being diagonal to the longitudinal axis, each printable element occupying a printable element position defined by an intersection of a printable element row and a printable element column, each printable element position being spaced from neighboring printable element positions; and wherein the printable elements are sequenced following a spiraling pattern.

* * * * *